US008277274B2

(12) United States Patent
Emilsson et al.

(10) Patent No.: US 8,277,274 B2
(45) Date of Patent: Oct. 2, 2012

(54) APPARATUS AND METHODS FOR USE OF REFRACTORY ABHESIVES IN PROTECTION OF METALLIC FOILS AND LEADS

(75) Inventors: Tryggvi Emilsson, Champaign, IL (US); Nikolaus Voggenauer, Fithian, IL (US)

(73) Assignee: Advanced Lighting Technologies, Inc., Solon, OH (US)

( * ) Notice: Subject to any disclaimer, the term of this patent is extended or adjusted under 35 U.S.C. 154(b) by 457 days.

(21) Appl. No.: 12/453,066

(22) Filed: Apr. 28, 2009

(65) Prior Publication Data

US 2009/0295291 A1 Dec. 3, 2009

Related U.S. Application Data

(60) Continuation-in-part of application No. 11/545,469, filed on Oct. 11, 2006, which is a division of application No. 10/702,558, filed on Nov. 7, 2003, now Pat. No. 7,153,179.

(60) Provisional application No. 60/424,338, filed on Nov. 7, 2002, provisional application No. 61/071,417, filed on Apr. 28, 2008.

(51) Int. Cl.
*H01J 61/36* (2006.01)
*H01J 9/00* (2006.01)
*H02G 3/04* (2006.01)

(52) U.S. Cl. ........ 445/58; 427/419.2; 427/452; 427/117

(58) Field of Classification Search .................. 313/567, 313/623–625, 634–636, 493, 318.12, 570, 313/578, 331–333; 118/50; 445/26, 27, 58, 46; 427/419.2, 452, 117, 123, 111
See application file for complete search history.

(56) References Cited

U.S. PATENT DOCUMENTS

| | | | | |
|---|---|---|---|---|
| 2,518,944 | A | 8/1950 | Scott | |
| 2,617,068 | A | 11/1952 | Spinnler et al. | |
| 3,420,944 | A | 1/1969 | Holcomb | |
| 3,540,863 | A | 11/1970 | Priceman et al. | |
| 3,582,704 | A * | 6/1971 | Fridrich | 313/331 |
| 3,668,391 | A | 6/1972 | Kimball | |
| 3,668,456 | A | 6/1972 | Anderson | |
| 3,693,241 | A | 9/1972 | Fridrich | |

(Continued)

FOREIGN PATENT DOCUMENTS

GB 671178 A 4/1952

(Continued)

OTHER PUBLICATIONS

European Patent Office, European Search Report, EP Application No. 09739151 mailed Aug. 3, 2011, 2 pages.

*Primary Examiner* — Anh Mai
*Assistant Examiner* — Elmito Breval
(74) *Attorney, Agent, or Firm* — Duane Morris LLP

(57) ABSTRACT

A device having a quartz or glass body forming a chamber hermetically sealed by one or more pinch seals formed in the body wherein a metallic foil provides an electrical connection through a pinch seal. A method is provided for protecting a portion of the metallic foil from corrosion prior to forming the pinch seal by coating at least a portion of the foil with a film comprising silica, and applying a refractory abhesive to at least a portion of the film.

20 Claims, 7 Drawing Sheets

U.S. PATENT DOCUMENTS

| | | | | |
|---|---|---|---|---|
| 3,753,026 | A * | 8/1973 | Goorissen | 313/318.12 |
| 3,793,615 | A | 2/1974 | Homonnay et al. | |
| 3,821,587 | A | 6/1974 | Libermann et al. | |
| 3,867,166 | A | 2/1975 | Sullivan | |
| 3,926,574 | A | 12/1975 | Priceman | |
| 3,956,660 | A | 5/1976 | Ooms | |
| 3,977,892 | A | 8/1976 | Crossmore, Jr. | |
| 4,015,465 | A | 4/1977 | Scott | |
| 4,209,484 | A | 6/1980 | Denis et al. | |
| 4,298,768 | A | 11/1981 | Isreal et al. | |
| 4,478,876 | A | 10/1984 | Chung | |
| 4,539,509 | A | 9/1985 | Varshneya | |
| 4,613,301 | A | 9/1986 | Miyoshi et al. | |
| 4,682,071 | A | 7/1987 | Thorpe | |
| 4,707,723 | A | 11/1987 | Okamoto et al. | |
| 4,739,219 | A | 4/1988 | Hume | |
| 4,749,902 | A | 6/1988 | Weiss | |
| 4,755,712 | A | 7/1988 | Mujahid et al. | |
| 4,766,346 | A | 8/1988 | Weiss et al. | |
| 4,808,481 | A | 2/1989 | Luxon | |
| 4,822,642 | A | 4/1989 | Cabrera et al. | |
| 4,835,439 | A | 5/1989 | Essock et al. | |
| 4,889,776 | A | 12/1989 | Priceman | |
| 4,927,714 | A | 5/1990 | Priceman | |
| 4,942,732 | A | 7/1990 | Priceman | |
| 5,021,711 | A | 6/1991 | Madden et al. | |
| 5,223,045 | A | 6/1993 | Priceman | |
| 5,269,810 | A | 12/1993 | Hull et al. | |
| 5,310,374 | A | 5/1994 | Tomoyuki | |
| 5,340,448 | A | 8/1994 | Seekhar et al. | |
| 5,387,840 | A | 2/1995 | Noteleteirs et al. | |
| 5,402,038 | A | 3/1995 | Parham et al. | |
| 5,438,083 | A | 8/1995 | Takimoto et al. | |
| 5,532,195 | A | 7/1996 | Weiss et al. | |
| 5,536,991 | A | 7/1996 | Parham | |
| 5,616,229 | A | 4/1997 | Samsonov et al. | |
| 5,676,863 | A | 10/1997 | Jouvenel et al. | |
| 5,721,187 | A | 2/1998 | Ogawa et al. | |
| 5,754,005 | A | 5/1998 | Sakoske et al. | |
| 5,881,645 | A | 3/1999 | Lenney et al. | |
| 6,084,352 | A | 7/2000 | Seki et al. | |
| 6,181,064 | B1 | 1/2001 | Narita | |
| 6,214,474 | B1 | 4/2001 | Barbist et al. | |
| 6,455,107 | B1 * | 9/2002 | Sekhar et al. | 427/419.2 |
| 6,600,266 | B1 | 7/2003 | Nakagawa | |
| 6,812,639 | B2 | 11/2004 | Ward et al. | |
| 2001/0003411 | A1 | 6/2001 | Honda et al. | |

FOREIGN PATENT DOCUMENTS

| | | | |
|---|---|---|---|
| GB | 721621 | A | 1/1955 |
| GB | 779179 | A | 7/1957 |
| GB | 925384 | A | 5/1963 |
| GB | 1207221 | A | 9/1970 |
| GB | 1521129 | A | 8/1978 |
| JP | 56075596 | A | 6/1981 |
| JP | 57035678 | A | 2/1982 |
| JP | 01-251553 | | 10/1989 |
| JP | 05085714 | A | 4/1993 |
| JP | 05089946 | A | 4/1993 |
| JP | 08269790 | A | 10/1996 |
| JP | 09320546 | A | 12/1997 |
| JP | 11111240 | A | 4/1999 |
| JP | 11162406 | A | 6/1999 |
| JP | 2001236926 | A | 8/2001 |

* cited by examiner

APPARATUS AND METHODS FOR USE OF REFRACTORY ABHESIVES IN PROTECTION OF METALLIC FOILS AND LEADS

RELATED APPLICATIONS

The instant application is a continuation-in-part application and claims the filing-date benefit of co-pending U.S. patent application Ser. No. 11/545,469, filed Oct. 11, 2006 which is a divisional application of and claims priority to U.S. patent application Ser. No. 10/702,558, filed Nov. 7, 2003, now U.S. Pat. No. 7,153,179, which claims the filing-date benefit of U.S. Provisional Patent Application No. 60/424,338 filed Nov. 7, 2002, and incorporates each of said applications herein in their entirety.

The instant application also claims the filing-date benefit of U.S. Provisional Patent Application No. 61/071,417 filed Apr. 28, 2008, the entirety of which is incorporated herein by reference.

BACKGROUND

The present subject matter generally relates to electrical lead assemblies in devices such as electric lamps for providing an electrical path through a hermetic press, pinch, or shrink seal formed in a vitreous material such as fused silica or hard glass.

In certain devices, it is often necessary to provide an electrically-conducting path through a pinch or shrink seal formed in a vitreous material. For example, in devices such as electric lamps, e.g., halogen incandescent filament bulbs and high intensity discharge ("HID") arc tubes, a light emitting chamber is formed from a vitreous material having one or more pinch seals that hermetically seal the chamber. In such lamps, one or more electrically-conducting paths from the interior of the chamber to the exterior of the chamber are typically formed by positioning an electrical assembly in one or more of the portions of the tube, and "pinching" the tube to form a hermetic seal around a portion of the assembly. The electrical lead assembly typically includes a metallic foil having electrically conducting leads mechanically secured to the foil and extending from each end thereof. The assembly is positioned so that the foil forms the electrically conducting path through a portion of the vitreous material that has been pinched or shrunk together to form a hermetic seal.

Although any suitable material may be used, typically, the foil in such electrical lead assemblies is formed from molybdenum because of its stability at high temperatures, relatively low thermal expansion coefficient, good ductility, and sufficient electrical conductivity. However, molybdenum oxidizes rapidly when exposed to oxygen at temperatures greater than about 350° C. Since the foils in electrical lead assemblies in electric lamps are often exposed to temperatures greater than about 350° C., the metallic foil may be highly susceptible to oxidation resulting in a breach of the electrical path or the gas-tight integrity of the hermetic seal resulting in lamp failure. Typically, a molybdenum foil exposed to a reactive atmosphere will not oxidize appreciably below about 350° C. At temperatures greater than about 350° C., the rate of the reaction between the oxygen in the surrounding atmosphere and the molybdenum foil greatly increases resulting in corrosion of the foil and a substantial reduction in the useful life of the lamp. Areas particularly susceptible to such oxidation include the spot weld connecting the outer lead to the foil and the area on the foil adjacent the outer lead.

FIG. 1*a* is a schematic representation of a conventional arc tube for a high intensity discharge lamp. Referring to FIG. 1*a*, the arc tube 100 is formed from light transmissive material such as quartz. The arc tube 100 defines a chamber 110 formed by pinch sealing the end portions 115, 120. An electrode assembly 122, 124 is sealed within each end portion 115, 120 to provide an electrically-conducting path from the interior of the chamber 110 to the exterior of the chamber through each end portion 115, 120. Each electrode assembly 122, 124 for a high intensity discharge arc tube 100 typically includes a discharge electrode 125, 130, electrode leads 140, 135, metallic foils 145, 150, and outer leads 155, 160. The electrode leads 135, 140 and the outer leads 155, 160 are typically connected to the metallic foils 145, 150 by spot welds.

FIG. 1*b* is an illustration of the cross-section of a typical metallic foil 145, 150 in an electrical lead assembly 122, 124. As shown in FIG. 1*b*, the typical foil 145, 150 is shaped in cross-section so that the thickness of the foil is greatest at the lateral center thereof, and reduces outwardly to each of the longitudinal edges. This shape has been found to reduce residual strain in the vitreous material that has been compressed around the foil during the high temperature pinching process and subsequently cooled. In a typical electrical lead assembly for an electric lamp, the foil may have a width of about 2 to 5.5 mm with a centerline thickness of about 20 to 50 μm and an edge thickness of about 3 to 7 μm. For example, a foil having a width of about 2.5 mm would typically have a centerline thickness of about 24-25 μm and an edge thickness of about 3 μm.

The assemblies 122, 124 are positioned in the end portions 115, 120 so that the foils 145, 150 are pinched between the compressed portions of the end portions 115, 120 forming the hermetic pinch seals. The assemblies 122, 124 provide the electrically conducting paths through the each end portion 145, 150 with the relatively thin foils 145, 150 providing a current path through the hermetically sealed pinch regions.

The electrode lead assemblies provide a point of failure in such lamps due to corrosion, e.g., oxidation, of the metallic foils when exposed to corrosive agents such as oxygen at high temperatures. This is primarily a problem for lamps that are operated in air, without an outer jacket, such as high wattage metal halide "sports" lamps, ultraviolet exposure lamps, HID projection light sources, and numerous incandescent tungsten halogen light sources. For example, the assemblies 122, 124 are particularly susceptible to oxidation at the outer portion of the foil 145, 150 adjacent the outer lead 155, 160 due to the exposure of this portion of the foil to oxygen or other corrosive agents during operation of the lamp. The oxidation may progress inward placing a significant amount of stress on the pinch seal. The stress may be evident from Newton rings or passageways which appear at the point at which the leads are welded to the molybdenum foil. Eventually, the electrical path may be breached or the pinch seal may crack causing the lamp to fail.

One reason for this failure is that during the formation of a pinch seal or vacuum seal with a vitreous material such as quartz, the quartz does not completely seal to the relatively thicker outer and inner lead wires, due at least in part to the relatively high viscosity of the quartz. Microscopic passageways may also be formed along the outer leads 155, 160 and also along the outer edge of the foliated portion perpendicular to the transverse axis of the lamp due to the substantial difference in the coefficient of thermal expansion of the quartz compared to that of the refractory metal outer lead wire, which is typically tungsten or molybdenum.

Another reason for this failure may also be the result of two mechanisms. First, as the molybdenum foil, wire or weld junction oxidizes, its resistance increases, leading to a further ohmic heating and higher temperatures and higher oxidation rates, eventually "burning" through the molybdenum material. Second, as the molybdenum foil, wire or weld junction oxidizes, molybdenum oxide products form. These oxides are generally less dense than the molybdenum metal materials, and the resulting expansion forces the quartz-to-metal or glass-to-metal seal apart, causing cracks and breaks. This second mechanism may also expose additional areas of molybdenum materials to air oxidation. Another common problem in pinch and shrink seals is the phenomenon referred to as "shaling." In shaling, uneven stresses in the pinch or shrink area may be caused by the adherence of the quartz to the molybdenum metal surfaces thereby resulting in minute cracks. These cracks severely weaken the glass and may lead to failure of the respective lamp from very moderate strains.

Efforts have been made in the past to prevent the oxidation of molybdenum foils in electrical assemblies that may be exposed to oxygen at high temperatures. For example, it has been proposed to reduce oxidation by coating the molybdenum foil with oxidation-protective materials such as phosphides (U.S. Pat. No. 5,387,840), aluminides, lead oxide, silicon nitride, alkali metal silicate and chromium (U.S. Pat. No. 3,793,615). Another conventional practice for protecting the molybdenum foil involves filling the open end of the pinch or shrink area with a low-melting antimony borate glass. Yet another conventional practice includes protecting the outer lead with a platinum cladding. The utility of the aforementioned prior art approaches are marginally adequate and/or expensive; however, none of these prior art approaches includes the application of glassy films. A need, therefore, remains for oxidation-protected metallic foils for use in electrical lead assemblies for providing electrically-conducting paths through pinch seals in vitreous material and that can be exposed to high operating temperatures. It is therefore an object of the present subject matter to provide electrical lead assemblies that obviate the deficiencies of the prior art.

One embodiment of the present subject matter provides a means of protecting metallic foils and outer lead wires in electrical lead assemblies of electric lamps from oxidation through the application of a coating containing a refractory "abhesive" such as, but not limited to, boron nitride to the surface of the metallic foil or to the lead wire or to the foil-lead junction. An abhesive is generally a material having the capability of resisting adhesion.

Another embodiment of the present subject matter utilizes high temperature of the pinch process itself to fuse a "green" formulation of silica onto complete lead assemblies; thus protecting the foil, the lead wire and the critical weld junction with a continuous film of dense silica. An example of a green formulation is described in parent and co-pending U.S. patent application Ser. No. 11/545,469, filed Oct. 11, 2006 which is a divisional application of and claims priority to U.S. patent application Ser. No. 10/702,558, filed Nov. 7, 2003, now U.S. Pat. No. 7,153,179, each of which are incorporated herein in their entirety.

Yet another embodiment of the present subject matter prevents or eliminates "shaling" in which uneven stresses in the pinch area are caused by the sticking of the vitreous material or quartz to the molybdenum or other metal surfaces.

One embodiment of the present subject matter provides a method of protecting a portion of a metallic foil from corrosion comprising coating a portion of the foil with a film comprising silica and applying a refractory abhesive to a portion of the film, each step occurring prior to forming a pinch seal. Another embodiment of the present subject matter is a novel method of providing an electrical connection through a pinch or shrink seal formed in a quartz or glass body. This method may comprise providing a quartz or glass body having at least one open end and providing an electrical lead assembly comprising a metallic foil. The method may also include applying a coating comprising a refractive abhesive to at least a portion of the metallic foil, positioning the electrical lead assembly in an open end of the body, and pinch or shrink sealing the open end of the body so that the quartz or glass of the body forms a hermetic seal around the metallic foil of the electrical lead assembly.

A further embodiment of the present subject matter provides a method of preparing an electrode lead assembly. The method may comprise providing an electrode lead assembly comprising a metallic foil and immersing at least a portion of the electrode lead assembly in a silica colloidal mixture. The method may also include removing the assembly from the mixture and coating the dried mixture on the assembly with graphite or boron nitride.

In one embodiment of the present subject matter a novel device is provided comprising a quartz or glass body forming a chamber and having one or more pinch or shrink seals formed in the body, and a metallic foil positioned within the pinch or shrink seal, the metallic foil having a coating on at least a portion thereof comprising a refractory abhesive.

Another embodiment of the present subject matter provides a novel electrical lead assembly suitable for providing an electrical connection through a pinch seal in a quartz or glass body where the assembly includes a metallic foil having a coating on at least a portion thereof comprising a refractory abhesive. A further embodiment of the present subject matter provides a novel electrical lead assembly having a portion of metallic foil and an electrode or filament pin attached to said foil. An electrical lead may be attached to the foil, and a coating may cover at least a portion of the assembly, the coating having a refractory abhesive.

In a further embodiment of the present subject matter, a method is provided including the steps of providing an electrical lead assembly comprising a metallic foil and applying a protective layer comprising fusible glass precursors to at least a portion of the assembly. A layer of material may be applied over at least a portion of the protective layer, the material being suitable for preventing adhesion of the protective layer overlaid by the material and a glass body when the electrical lead assembly is sealed within a pinch or shrink seal in the body.

Another method of the present subject matter may include the steps of providing an electrical lead assembly comprising a metallic foil and applying a protective layer to at least a portion of the assembly, the protective layer comprising fusible glass precursors and a material which prevents mechanically strong bonding of the protective layer to a glass body when the electrical lead assembly is sealed within a pinch or shrink seal in the body.

One novel electrical lead assembly according to an embodiment of the present subject matter includes a metallic foil having one or more leads attached thereto, and a protective layer on at least a portion of the metallic foil, the protective layer comprising one or more fusible glass precursors. The assembly may also include a layer of material overlaying at least a portion of the protective layer, the material being suitable for preventing adhesion of the protective layer overlaid by the material and a glass body when the electrical lead assembly is sealed within a pinch or shrink seal in the body.

It will be noted that although the present invention is illustrated with these and other objectives, that the principles of the invention are not limited thereto and will include all applications of the principles set forth herein. These and other objects can be realized by simultaneous reference with the following non-exhaustive illustrative embodiments in which like segments are numbered similarly.

DETAILED DESCRIPTION OF THE DRAWINGS

Figure 1A:
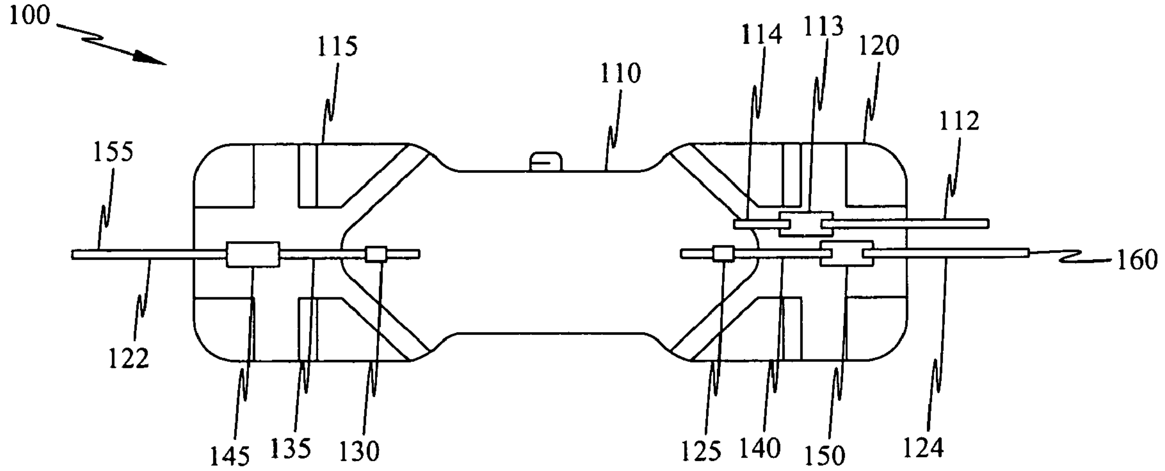
FIGURE 1a PRIOR ART
FIG. 1*a* is a schematic representation of a conventional arc tube for a high intensity discharge lamp.
Figure 1B:
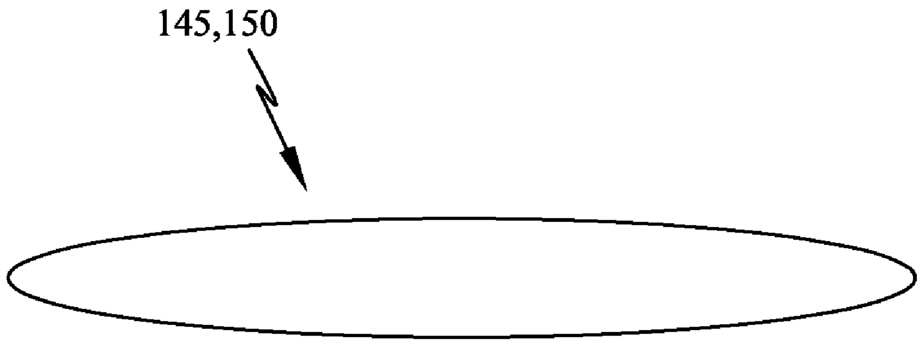
FIGURE 1b PRIOR ART
FIG. 1*b* is an illustration of a prior art metallic foil in cross-section.

In one embodiment of the present subject matter, a metallic foil may be coated to inhibit corrosion and the method for applying such coating. In another embodiment of the present subject matter, a metallic foil may be substantially protected from corrosion when exposed to corrosive agents at high temperature. Such a foil is particularly advantageous in electrical lead assemblies because the foil may form the outer lead in the assembly and may extend beyond the end portion of the arc tube, thus eliminating the relatively thicker wire outer lead.

In another embodiment of the present subject matter, a method is provided for protecting metallic foils in electrical lead assemblies from corrosion is provided by coating the foil with a silica film, refractory abhesive and/or combination thereof. The coating provides a barrier for the foil to oxygen and other corrosive agents at high temperatures, thus reducing the corrosion of the foil and eliminating a significant cause of premature failure in electric lamps.

In yet another embodiment of the present subject matter, a method is provided for coating metallic foil by immersing at least a portion of the foil in a bath of colloidal silica and/or silica-abhesive slurry, withdrawing the foil from the bath at a controlled rate so that silica colloid adheres to the foil, and exposing the silica colloid to a temperature sufficient to effect fusion of silica particles thereby forming a thin film of silica on the foil. Several factors may be considered in determining the thickness of the film including the viscosity of the bath, the surface tension of the bath, the temperature of the bath, and the wetting properties of the bath. The speed by which the foil is withdrawn from the bath may also be controlled. Several exemplary methods are described in parent and co-pending U.S. patent application Ser. No. 11/545,469 which is a divisional application of U.S. Pat. No. 7,153,179, each of which are incorporated herein in their entirety; however, other methods of applying the coating to the foil may be used. For example, the coating may be applied by electrostatic spray coating, dipping, rolling, brushing and misting. Another techniques for applying the coating may include adding fine silica powder to the plume of an argon plasma torch thereby producing a spray of liquid silica.

When silica coated structures are sealed into fused vitreous material such as quartz, the coatings adhere to the vitreous material since they are the same material. Upon cooling and thermal contraction, the protective coating may peel or strip off the metal and severe shaling of the glass may be observed. Through an application of a refractory abhesive to the silica coated structures, the fused vitreous material does not adhere, and the integrity of the protective coat may be maintained. Exemplary refractory abhesive materials may be, but are not limited to, boron nitride, graphite, powders or flakes of refractory metals (such as Tungsten, Tantalum, Hafnium, Niobium, Rhenium, Osmium, etc.), or powders or flakes of refractory oxides (such as Yttrium Oxide, Zirconium Oxide, Thorium Oxide, Magnesium Oxide, Beryllium Oxide, etc.). The application of refractory abhesive materials to embodiments of the present subject matter may also prevent shaling of the silica glass caused by adherence to metal parts during pinching. Therefore, in embodiments of the present subject with or without an underlying silica coat, refractory abhesives may improve the life of a pinch or shrink seal and hence the respective arc tube or lamp by preventing the weakening of the vitreous material and by reducing the oxidation of the metal (e.g., slowing the access of air to the vulnerable metal). The permeability to air may be further decreased by fusible additives in the refractory abhesive formulation that promotes bonding of the refractory abhesive particles to each other and to the metal.

Additional protection of the foils and outer lead wires in electrical lead assemblies of electric lamps may also be achieved by mixing colloidal silica with a refractory abhesive slurry. This mixture may be applied to the assemblies by dipping, spraying, or any other suitable method. When the assembly is pinched or shrunk, the silica fuses, covering the metal with liquid silica and trapping the refractory abhesive particles in a silica matrix. Upon cooling of the assembly, the silica may remain bonded to the metal and any thermally induced cracking may occur within the silica-abhesive layer.

Certain combinations of silica-abhesive (e.g., silica-boron nitride, etc.) may react chemically with the metal to produce coatings of materials having exceptional oxidation protective properties. By way of a non-limiting example, it has been observed that certain mixtures of silica-boron nitride causes a melting of the molybdenum surface and creates a layer of a substance highly resistant to oxidation. In this example, the layer appears to be a molybdenum boride. Of course, other compositions of silica-abhesives may be equally effective, and such an example should not limit the scope of the claims appended herewith.

Figure 2:
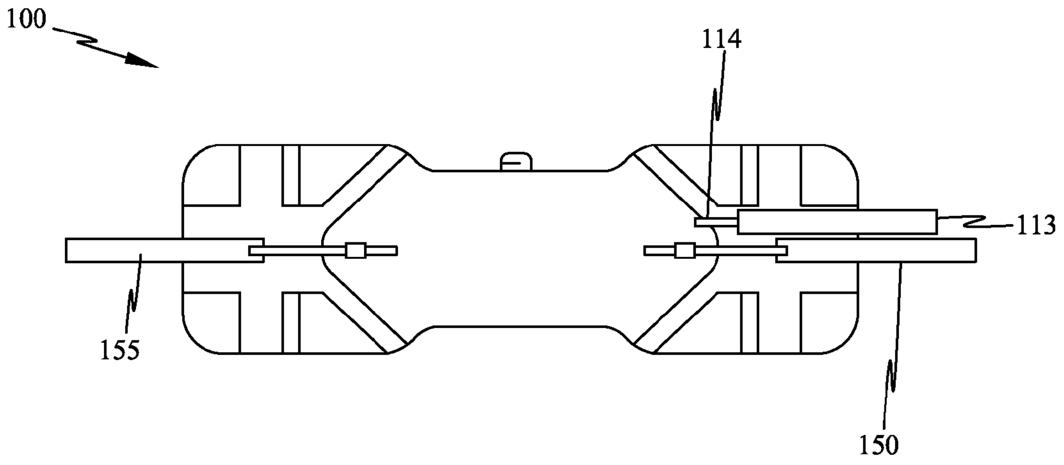
FIG. 2 is a schematic representation of an arc tube in accordance with one embodiment of the present subject matter.

FIG. 2 is a schematic representation of a pinched tube in accordance with one embodiment of the present subject matter. With reference to FIG. 2, outer leads in the assemblies are eliminated by extending the length of the foil. By extending the foils 113, 150, 155, the outer leads may be eliminated from the assembly. This embodiment has the additional advantage of eliminating the need to adhere (spot weld, mechanical attachment, etc.) the outer leads to the foil. This will enhance the life of the lamp by avoiding the capillary formation or other such voids in the pinch seal. Further enhancement of the life of the lamp may be provided by coating any portion(s) of the foils 113, 150, 155 with an exemplary refractory abhesive or a silica-abhesive coating described above.

Figure 3:
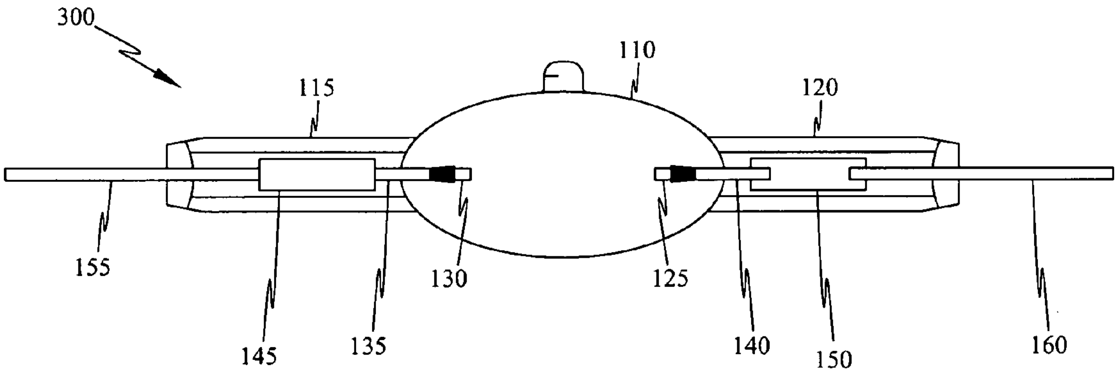
FIG. 3 is a schematic representation of a formed body arc lamp for a high intensity discharge lamp.

FIG. 3 schematically represents another embodiment of the present subject matter. With reference to FIG. 3, an arc tube 300 may include the chamber 110 and the end portions 115, 120 that are sealed by pinching. The lead assemblies may include electrode leads 135, 140, foils 145, 150, and outer leads 155, 160. Enhancement of the life of the arc tube 300 may be provided by coating any portion(s) of the end portions 115, 120 and/or the lead assemblies including the electrode leads 135, 140, foils 145, 150 and outer leads 155, 160 with an exemplary refractory abhesive or a silica-abhesive coating described above.

Figure 4:
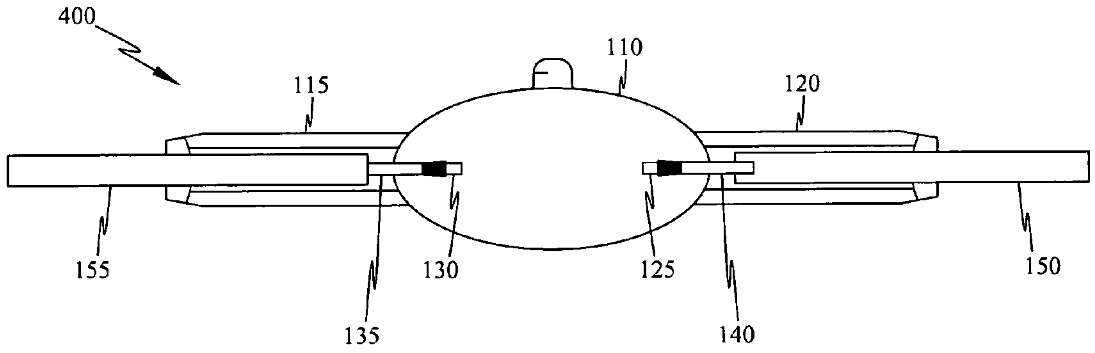
FIG. 4 is a schematic representation of another embodiment of the formed-body high intensity discharge lamp according to the present subject matter.

FIG. 4 is a schematic representation of another embodiment of the present subject matter. With reference to FIG. 4, each of foils 150, 155 may be extended beyond the respective end portions 115, 120 of the arc tube 400 thereby eliminating the outer leads from the assemblies. Of course, enhancement of the life of the arc tube 400 may be provided by coating any portion(s) of the end portions 115, 120 and/or foils 150, 155 with an exemplary refractory abhesive or a silica-abhesive coating described above.

Figure 5:
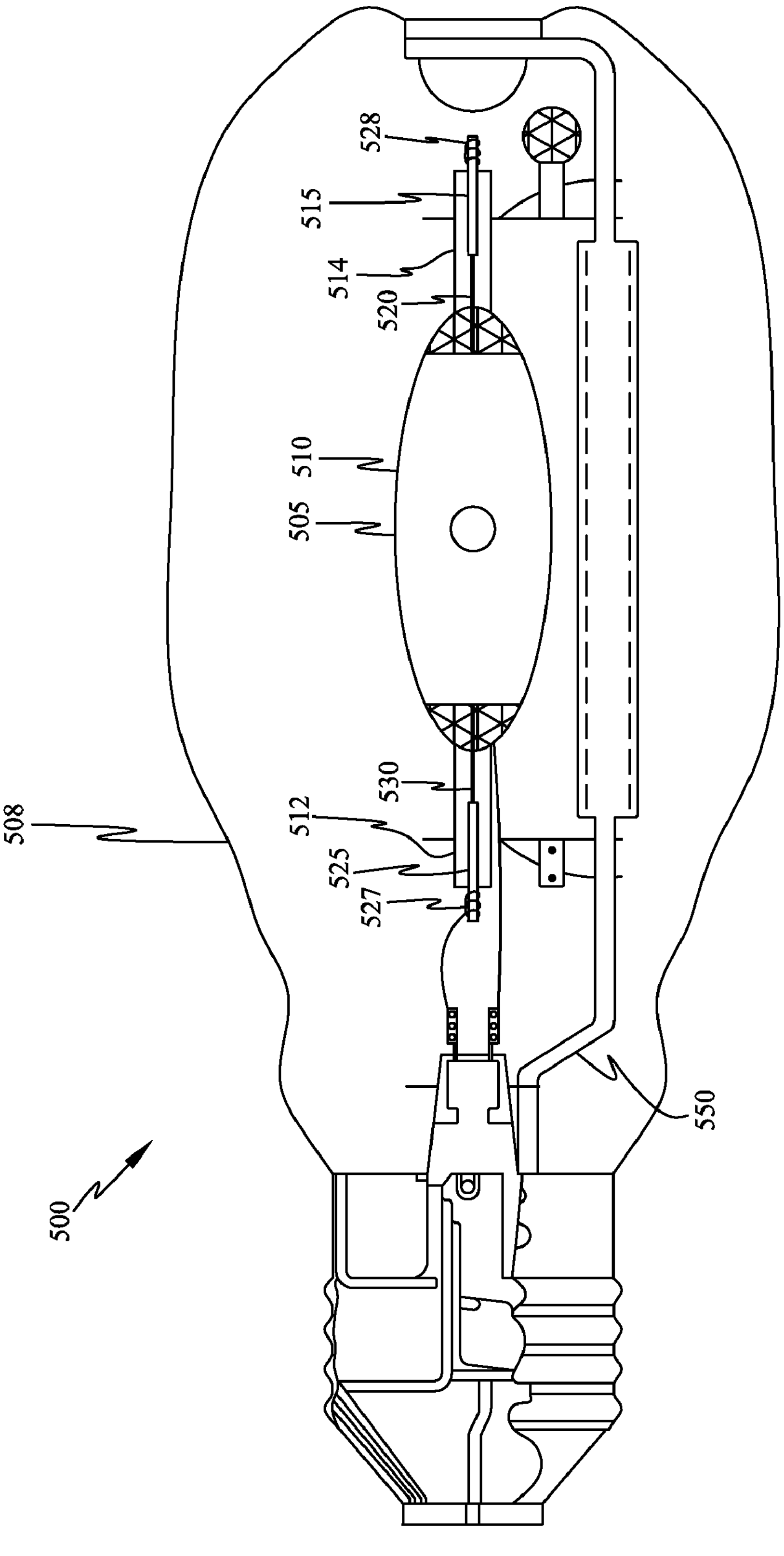
FIG. 5 is a schematic representation of a high intensity discharge lamp according to an embodiment of the present subject matter showing a mechanical support of arc tube and wrapped/crimped electrical connections to foil.

FIG. 5 is a schematic representation of a high intensity discharge lamp according to another embodiment of the invention showing a mechanical support for arc tube and wrapped/crimped electrical connections to the foil. High intensity discharge lamp 500 includes an arc tube 505 supported with the outer lamp envelope 508 of the lamp 500. The arc tube 505 includes a bulbous chamber 510 intermediate tubular end portions 512, 514. The arc tube 505 is mechanically secured within the envelope by supporting the arc tube at the end portions 512, 514 thereof. The electrical assemblies of the arc tube include metallic foils 515, 525 that extend beyond the end portions 512, 514 to provide electrical connections for the arc tube. The electrical leads connecting the lamp base to the foils are mechanically and electrically secured to the foils by coil connections 527, 528. Although the foils 515, 525 are not as mechanically rigid as the outer leads in conventional lead assemblies, mechanical deformation of the foils is minimized by supporting the arc tube 505 from the end portions 512, 514. Enhancement of the life of the arc tube 500 may be provided by coating any portion(s) of the electrical assemblies of the arc tube 500 including the foils 515, 525 with an exemplary refractory abhesive or a silica-abhesive coating described above.

Figure 6:
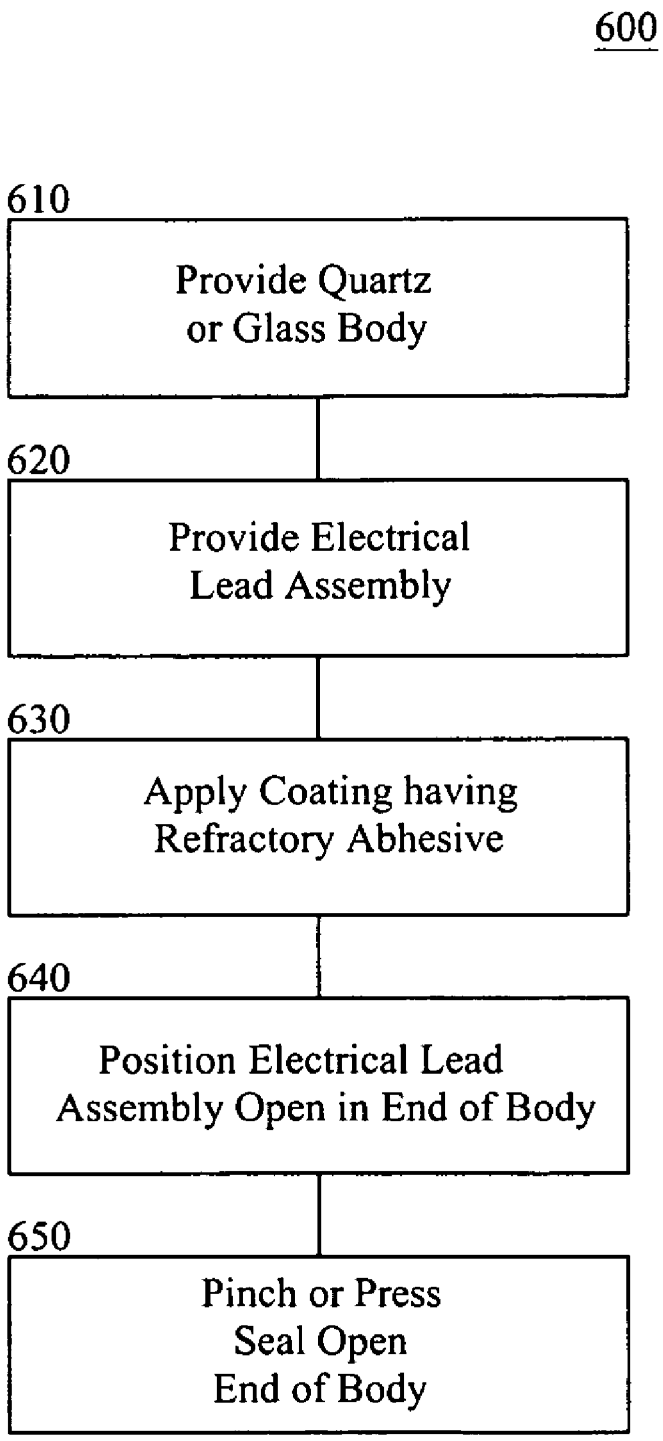
FIG. 6 is a representation of one embodiment of the present subject matter.

FIG. 6 is a representation of one embodiment of the present subject matter. With reference to FIG. 6, a method 600 of providing an electrical connection through a pinch or shrink seal formed in a quartz or glass body is illustrated. At step 610, a quartz or glass body having at least one open end is provided, and at step 620, an electrical lead assembly comprising a metallic foil is also provided. In one embodiment the metallic foil may be formed from molybdenum, however, such an example should not limit the scope of the claims appended herewith as the metallic foil may be formed from any suitable metal or material. At step 630, a coating comprising a refractory abhesive may be applied to at least a portion of the metallic foil. The refractory abhesive may be, but is not limited to, boron nitride, graphite, powders or flakes of refractory metals, and powders or flakes of refractory oxides. In another embodiment of the present subject matter, the application of the refractory abhesive may include mixing colloidal silica with a refractory abhesive slurry and applying the mixture to at least a portion of the metallic foil. The electrical lead assembly may be positioned in an open end of the body at step 640, and the open end of the body may be pinch or shrink sealed so that the quartz or glass of the body forms a hermetic seal around the metallic foil of the electrical lead assembly at step 650.

EXAMPLE 1

Several electrode assemblies commonly utilized in 2000 Watt arc tubes were coated by dipping the assemblies into a bath containing an aqueous silica colloidal mixture. The mixture included:

| | |
|---|---|
| ST-OUP (from Nissan Chemical Corp.) | 9.0 gm |
| Water | 7.0 gm |
| Concentrated ammonia | 1.0 gm |
| Polyvinylpyrrolidone, 1% aqueous solution | 6.0 gm |
| $NaBO_2$, 5% aqueous solution | 1.6 gm |

After drying, the assemblies were overcoated with an exemplary refractory abhesive, specifically, (1) graphite (TC-2 from Fiber Materials, Inc.) diluted 1:1 with amyl acetate, and (2) boron nitride (BN Aerosol Brushable, Zyp Coatings). These exemplary assemblies were pinched into quartz lamp arc tubes, and then freed from the glass with a diamond saw. When anodically oxidized in 4% HCl, little blackening was observed, thereby illustrating that the "green" coat fused to the molybdenum parts. Both boron nitride and graphite coatings exhibited excellent oxidation properties.

EXAMPLE 2

Several electrode assemblies commonly utilized in 2000 Watt arc tubes were coated by dipping the assemblies into a bath containing an aqueous silica colloidal mixture. The mixture included:

| | |
|---|---|
| ST-OUP (from Nissan Chemical Co.) | 9.0 gm |
| Water | 7.0 gm |
| Concentrated ammonia | 1.0 gm |
| Polyvinylpyrrolidone, 1% aqueous solution | 6.0 gm |
| $NaBO_2$, 5% aqueous solution | 1.6 gm |

After drying, the assemblies were overcoated with an exemplary refractory abhesive only up to the outer lead weld. The refractory abhesives were (1) graphite (TC-2 from Fiber Materials, Inc.) diluted 1:1 with amyl acetate, and (2) boron nitride (BN Aerosol Brushable, Zyp Coatings). Several exemplary assemblies were placed in an oven at 400° C. and several were assembled into lamps. Testing indicated a significant reduction in oxidation rates of the coated foil/lead assemblies when compared to uncoated assemblies, with significant increases in lamp life.

EXAMPLE 3

Pieces of molybdenum foil and/or lead junctions and weld spots of bare assemblies, having no silica coatings were provided with a refractory abhesive coating, namely, boron nitride. Boron nitride coatings were also applied to the electrode shank/foil junctions. The refractory abhesive coatings provided no negative impact on the internal lamp operating characteristics. In comparison, lamps made with bare foil/lead assemblies illustrated a typical failure within 500 hours of operation; however, lamps made with the exemplary refractory abhesive coating of boron nitride exhibited no oxidation damage at 500 hours of operation.

EXAMPLE 4

Pieces of molybdenum foil and/or lead junctions and weld spots of bare assemblies, having no silica coatings were provided with a refractory abhesive coating, namely, a mixture of silica and boron nitride. Exemplary lamps made with this refractory abhesive coating exhibited excellent oxidation protection at 400° C. for several thousand hours of operation.

While preferred embodiments of the present invention have been described, it is to be understood that the embodiments described are illustrative only and the scope of the invention is to be defined solely by the appended claims when accorded the full range of equivalence, many variations and modifications naturally occurring to those of ordinary skill in the art from a perusal hereof.

What we claim is:

1. In a device having a quartz or glass body forming a chamber hermetically sealed by one or more pinch or shrink seals formed in the body wherein a metallic foil provides an electrical connection through a pinch or shrink seal, a method of protecting at least a portion of the foil from corrosion comprising the steps performed prior to forming the pinch seal:

coating at least a portion of the foil with a film comprising silica; and applying a refractory abhesive to at least a portion of the film, wherein the refractory abhesive resists adhesion to the quartz or glass body.

2. The method of claim 1, wherein the portion of the foil includes a junction between the foil and an outer lead.

3. The method of claim 1, wherein the portion of the foil is distal from an electrode lead.

4. The method of claim 1, wherein the metallic foil is formed from molybdenum.

5. The method of claim 1, wherein the refractory abhesive is selected from the group consisting of boron nitride, graphite, powders or flakes of refractory metals, and powders or flakes of refractory oxides.

6. The method of claim 5, wherein the refractory abhesive comprises boron nitride.

7. The method of claim 5, wherein the refractory abhesive comprises graphite.

8. The method of claim 5, wherein the refractory abhesive comprises powders or flakes of refractory metals.

9. The method of claim 5, wherein the refractory abhesive comprises powders or flakes of refractory oxides.

10. The method of claim 1, wherein the film further comprises one or more metallic salts.

11. An electrical lead assembly comprising:

a metallic foil having one or more leads attached thereto;

a protective layer on at least a portion of said metallic foil, said protective layer comprising one or more fusible glass precursors;

a layer of material overlaying at least a portion of said protective layer, said material being suitable for preventing adhesion of the protective layer overlaid by the material to a quartz or glass body when said electrical lead assembly is sealed within a pinch or shrink seal in the body.

12. The electrical lead assembly of claim 11, wherein said protective layer is on at least a junction between said metallic foil and an outer lead attached to said metallic foil.

13. The electrical lead assembly of claim 11, wherein said protective layer is on at least a distal portion of said metallic foil relative to an electrode lead attached to said metallic foil.

14. The electrical lead assembly of claim 11, wherein said metallic foil is formed from molybdenum.

15. The electrical lead assembly of claim 11, wherein said material is selected from the group consisting of boron nitride, graphite, powders or flakes of refractory metals, and powders or flakes of refractory oxides.

16. The electrical lead assembly of claim 15, wherein said material comprises boron nitride.

17. The electrical lead assembly of claim 15, wherein said material comprises graphite.

18. The electrical lead assembly of claim 15, wherein said material comprises powders or flakes of refractory metals.

19. The electrical lead assembly of claim 15, wherein said material comprises powders or flakes of refractory oxides.

20. The electrical lead assembly of claim 11, wherein said protective layer further comprises one or more metallic salts.

* * * * *